(12) United States Patent
Annampedu et al.

(10) Patent No.: US 7,180,693 B2
(45) Date of Patent: Feb. 20, 2007

(54) METHOD AND APPARATUS FOR MAXIMUM LIKELIHOOD DETECTION OF DATA EMPLOYING INTERPOLATION WITH COMPENSATION OF SIGNAL ASYMMETRY

(75) Inventors: Viswanath Annampedu, Schnecksville, PA (US); Pervez M. Aziz, Dallas, TX (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 10/824,326

(22) Filed: Apr. 14, 2004

(65) Prior Publication Data
US 2005/0231844 A1   Oct. 20, 2005

(51) Int. Cl.
  G11B 5/09 (2006.01)
  G11B 20/10 (2006.01)
  G11B 21/02 (2006.01)
  G11B 5/596 (2006.01)
(52) U.S. Cl. ............... 360/46; 360/39; 360/51; 360/75; 360/77.04
(58) Field of Classification Search .......... 360/46, 360/68, 77.04
  See application file for complete search history.

(56) References Cited

U.S. PATENT DOCUMENTS 6,043,943 A * 3/2000 Rezzi et al. ............ 360/46
6,111,710 A * 8/2000 Feyh et al. ............. 360/46
6,549,351 B1 * 4/2003 Reed .................. 360/40
6,587,292 B1 * 7/2003 Ashley et al. ........... 360/39
6,657,802 B1 * 12/2003 Ashley et al. ........... 360/51

FOREIGN PATENT DOCUMENTS

EP    1251507 A2 * 10/2002

OTHER PUBLICATIONS

U.S. Appl. No. 10/436,526, filed May 13, 2003, Annampedu et al.
U.S. Appl. No. 10/676,560, filed Sep. 30, 2003, Annampedu et al.

\* cited by examiner

*Primary Examiner*—Wayne Young
*Assistant Examiner*—Daniell L. Negrón

(57) ABSTRACT

A method and apparatus are disclosed for detecting data, such as a sample sequence read from a recording channel. Interpolation techniques are employed to generate one or more interpolated sample sequences from the data. Each interpolated sample sequence has a different corresponding phase relative to the data. A distance measure is generated between a portion of each interpolated sample sequence and an ideal sample sequence. The ideal sample sequence corresponds to peaks in the data. According to one aspect of the invention, a signal asymmetry measure is computed for the portion of each sample sequence and is used to adjust an ideal sample sequence.

20 Claims, 10 Drawing Sheets

METHOD AND APPARATUS FOR MAXIMUM LIKELIHOOD DETECTION OF DATA EMPLOYING INTERPOLATION WITH COMPENSATION OF SIGNAL ASYMMETRY

CROSS-REFERENCE TO RELATED APPLICATIONS

The present application is related to U.S. patent application Ser. No. 10/436,526, filed May 13, 2003, entitled "Maximum Likelihood Detection of Asynchronous Servo Data Employing Interpolation," and U.S. patent application Ser. No. 10/676,560, filed Sep. 30, 2003, entitled "Detection of Recorded Data Employing Interpolation With Gain Compensation," each incorporated by reference herein.

FIELD OF THE INVENTION

The present invention relates generally to data detection techniques, and, more particularly, to the detection of asynchronous data, such as servo repeatable run out (RRO) information, having signal asymmetry.

BACKGROUND OF THE INVENTION

A read channel integrated circuit (IC) is one of the core electronic components in a modern hard disk drive. For example, in a magnetic recording system, a read channel converts and encodes data to enable the magnetic recording heads to write data to the disk drive and then read back the data accurately. The disks in a drive have many tracks on them and each track consists of mostly user or "read" data sectors as well as "servo" data sectors embedded between the read sectors. The information recorded in the servo sectors helps to position the magnetic recording head on track so that the information stored in the read sectors is retrieved properly.

Repeatable run out (RRO) refers to a phenomenon that occurs due to an imperfect spindle upon which the magnetic disk rotates that causes the magnetic disk to spin improperly at the center. If the disk is not rotating at the center, the magnetic recording head will not see a circular trajectory and hence will not be on-track to read the servo information properly. A similar phenomenon occurs when spindle imperfections were present when the servo information was written to the magnetic disk. Even though the disk may spin properly in a different hard disk while reading the servo information, the read head might not be able to read the servo information accurately since the information was not written properly on a circular track.

The "servo" data embedded between each read sector includes an RRO data field that helps to compensate for the known Error. The RRO data is used to properly guide the head to come on-track and thereby compensate for the spindle imperfections. The RRO data, however, is not recorded with a preamble field. Thus, the proper sampling phase (timing) to read the RRO information is not known. From a signal processing point of view, the problem of reading RRO information can be thought of as an "asynchronous" data detection problem. Also, the RRO address mark detection is more prone to false detections because the RRO detector starts looking for the RRO data without proper sampling phase (no preamble to guide the timing loop) and the RRO address mark only consists of a few bits. Such an adverse operating environment for RRO detection makes it challenging to properly detect the RRO data. The presence of signal asymmetry in the RRO field makes it even more challenging to detect RRO data.

A need therefore exists for a method and apparatus for compensating for signal asymmetry when detecting data.

SUMMARY OF THE INVENTION

Generally, a method and apparatus are provided for detecting data, such as a sample sequence read from a recording channel. Interpolation techniques are employed to generate one or more interpolated sample sequences from the data. Each interpolated sample sequence has a different corresponding phase relative to the data. A distance measure is generated between a portion of each interpolated sample sequence and an ideal sample sequence. The ideal sample sequence corresponds to peaks in the data. According to one aspect of the invention, a signal asymmetry measure is computed for the portion of each sample sequence and is used to adjust an ideal sample sequence.

The signal asymmetry measure indicates the extent of signal asymmetry in the data. The signal asymmetry measure may be, for example, a sum of values corresponding to one or more positive and negative peaks in the data. The sum of values can be used to adjust the ideal sample sequence and compensate for the signal asymmetry. The signal asymmetry measure can be averaged over a number of successful attempts to read the data. A positive signal asymmetry measure indicates that the peak levels have higher values than expected peak values. A negative signal asymmetry measure indicates that the peak levels have lower values than expected peak values.

The sample sequence may be RRO data in a magnetic recording system and the peak levels may be used, for example, to search for an RRO address mark.

A more complete understanding of the present invention, as well as further features and advantages of the present invention, will be obtained by reference to the following detailed description and drawings.

DETAILED DESCRIPTION

Figure 1A:
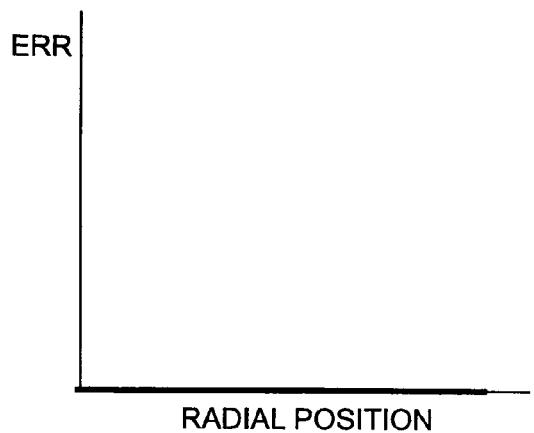
FIG. 1A illustrates the Error as a function of the radial position of a disk when the error is zero.
Figure 1B:
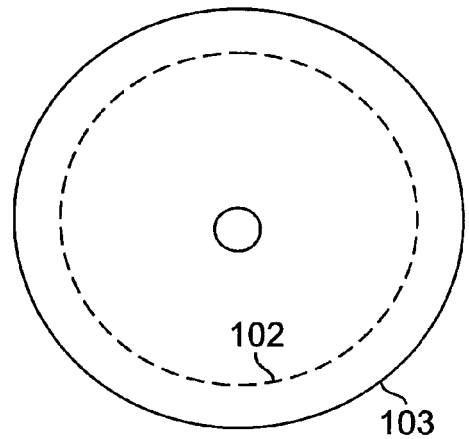
FIG. 1B illustrates a head tracking a circular trajectory for the graph of FIG. 1A.
Figure 1C:
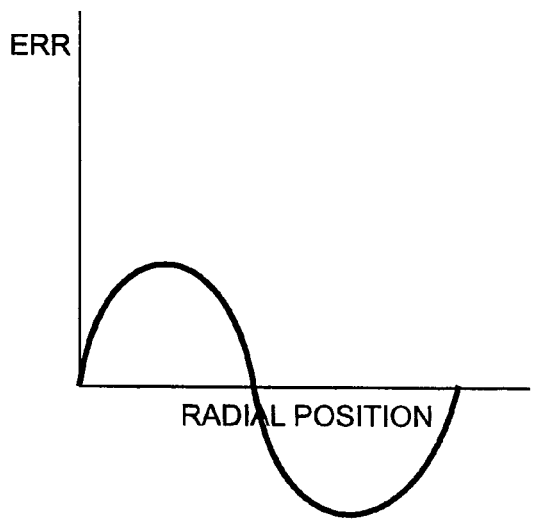
FIG. 1C illustrates radial position versus error of a head following a trajectory over a rotating disk for varying error that returns to zero after one revolution of the disk.
Figure 1D:
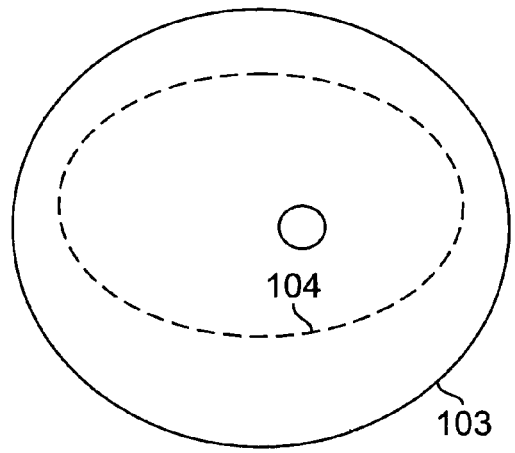
FIG. 1D illustrates a head tracking an oval path for the graph of FIG. 1C.

FIGS. 1A through 1D illustrate one form of RRO (termed a one "f" run out) that results from an imperfect spindle. FIG. 1A illustrates the Error as a function of the radial position of a disk 103 when the error is zero, corresponding to the head tracking in a circular trajectory as shown by the dashed circle 102 on disk 103 of FIG. 1B. As shown in FIG. 1C, the error for one "f" run out varies as a function of the radial position, but the error at a given position repeats after one revolution of the disk. As shown in FIG. 1D, the one "f" run out results from the head tracking an oval path, shown by the dashed path 104 on disk 103. Since the error "repeats" itself from one revolution to another, techniques may be devised to compensate for the problem. By feeding positioning information about the "repeatable" error to servo control circuitry, the error may be corrected to position the head properly over the servo track. State of the art magnetic recording systems employ digital signal processing to detect servo data as opposed to older systems employing analog techniques. While the present invention is illustrated in the context of an exemplary asynchronous data detector, the present invention also applies to the detection of synchronous data, as would be apparent to a person of ordinary skill.

Magnetic recording systems often employ digital signal processing techniques to detect servo information as opposed to older systems that employ analog techniques. Maximum likelihood (ML) detection techniques are often employed to detect asynchronous data, such as a repeatable run out (RRO) servo data. Maximum likelihood based RRO servo processing techniques are discussed further below in conjunction with FIGS. 4 through 6. For a detailed discussion of magnetic recording systems that employ ML detection of RRO data, see, U.S. patent application Ser. No. 10/436,526, filed May 13, 2003, entitled "Maximum Likelihood Detection of Asynchronous Servo Data Employing Interpolation," or U.S. patent application Ser. No. 10/676,560, filed Sep. 30, 2003, entitled "Detection of Recorded Data Employing Interpolation With Gain Compensation," each incorporated by reference herein.

Figure 2:
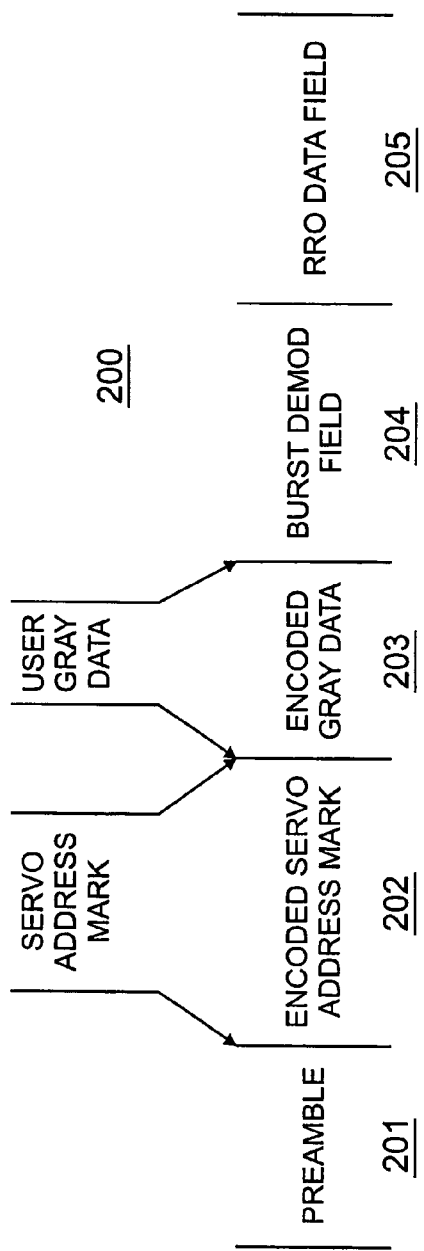
FIG. 2 illustrates an exemplary format of servo sector information.

FIG. 2 illustrates an exemplary format of servo sector information 200. As shown in FIG. 2, the exemplary servo sector information 200 comprises a preamble 201, such as a 2T preamble pattern, that allows the recording system to recover the timing and gain of the written servo data. The preamble 201 is typically followed by a servo address mark (SAM) 202 that is generally the same for all servo sectors and may then be followed by servo Gray data 203. The Gray data 203 is followed by one or more burst demodulation fields 204. The burst demodulation fields 204 are followed by the RRO field 205. The SAM 202 comprises some fixed number of bits. The Gray data 203 represents the track number/cylinder information and serves as a coarse positioning for the magnetic head. The burst demodulation field(s) 204 serves as a fine positioning system for the head to be on track. The RRO data 205 provides head positioning information that is finer than that provided by the Gray data 203 and coarser than that provided by the burst demodulation field(s) 204.

Figure 3:
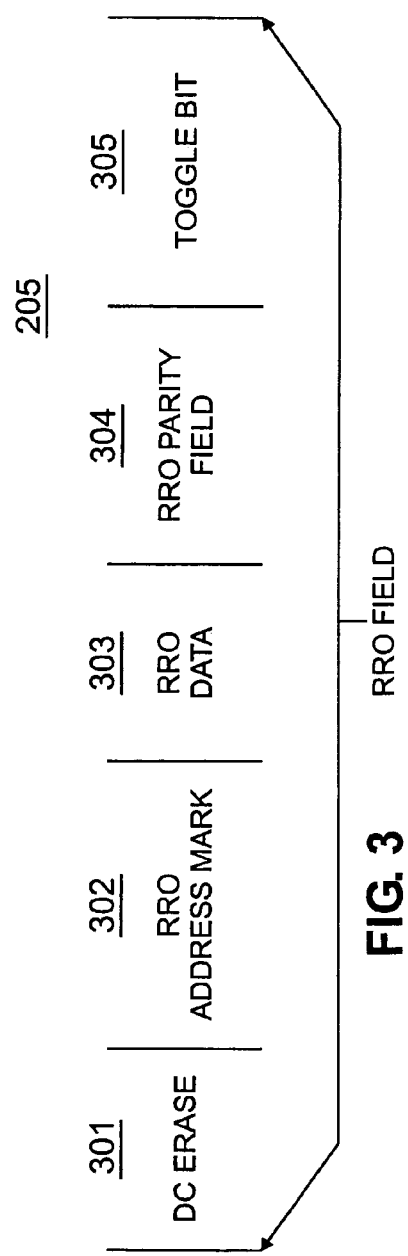
FIG. 3 illustrates an exemplary format of the RRO field format of FIG. 2.

FIG. 3 illustrates an exemplary format of the RRO field format 205. As shown in FIG. 3, the exemplary RRO field format 205 comprises a DC erase pattern 301 that is generally either a pattern of all zeros or all ones. The DC erase pattern 301 is followed by an RRO address mark 302. The RRO address mark pattern 302 is written in the same manner for all servo sectors. The RRO address mark 302 serves two purposes. First, the RRO address mark 302 indicates when to start decoding RRO data. Next, the RRO address mark 302 helps to select the best phase (as discussed further below) for decoding RRO data 303. The RRO data 303 is followed by parity bits 304 (to help enhance RRO performance if any parity error is detected) which in turn is followed by a toggle bit 305 that brings the magnetization level back to whatever magnetization level the disk used as the DC erase 301.

The servo preamble 201, SAM 202, Gray data 203 and the burst demodulation fields 204 are typically written by a servo track writer. However, the RRO data field 205 is typically written by the Read channel. For detecting the servo SAM 202, Gray data 203 and demodulation fields 204, a digital phase lock loop (DPLL) acquires proper sampling phase based on the timing information provided by the preamble field. However, for RRO detection, it is desirable not to write a preamble field for format efficiency reasons. Hence, the proper sampling phase (timing) to read the RRO information 205 is not known. Thus, from a signal processing point of view, the problem of reading RRO information 205 can be thought of as an "asynchronous" data detection problem. Also, the detection of the RRO address mark 302 is more prone to false detections because the RRO detector starts looking for the RRO address mark 302 in a DC erase field 301 without proper sampling phase (no preamble to guide the timing loop) and also only few bits are written for RRO address mark for format efficiency reasons. Such an adverse operating environment for RRO detection makes it very challenging to come up with algorithms to improve the detection performance. The presence of signal asymmetry in the RRO field 205 makes it even more challenging to detect RRO data.

The present invention improves the performance of maximum likelihood (ML) detection of asynchronous data, such as a repeatable run out (RRO) servo data, in the presence of signal asymmetry. As discussed further below in conjunction with FIGS. 4 through 6, the asynchronous maximum likelihood (AML) detector for RRO performs very well in the absence of signal asymmetry in the RRO field. However, the performance degrades in the presence of signal asymmetry in the readback signals. Usage of magneto resistive (MR) heads for reading information from a disk drive is one of the sources for signal asymmetry. Since the RRO information 205 is typically written by a read channel and not by a servo track writer along with other servo data fields, it is possible that when the read channel reads the RRO data 205 back it could encounter signal asymmetry. Since the RRO field 205 is typically very short without any training field such as the 2T preamble field, it is challenging to find a method to handle signal asymmetry for the AML detector. The invention can also be applied for any encoded (encoder independent schemes) system with any address mark and with any equalizer target, as would be apparent to a person of ordinary skill in the art.

Figure 4:
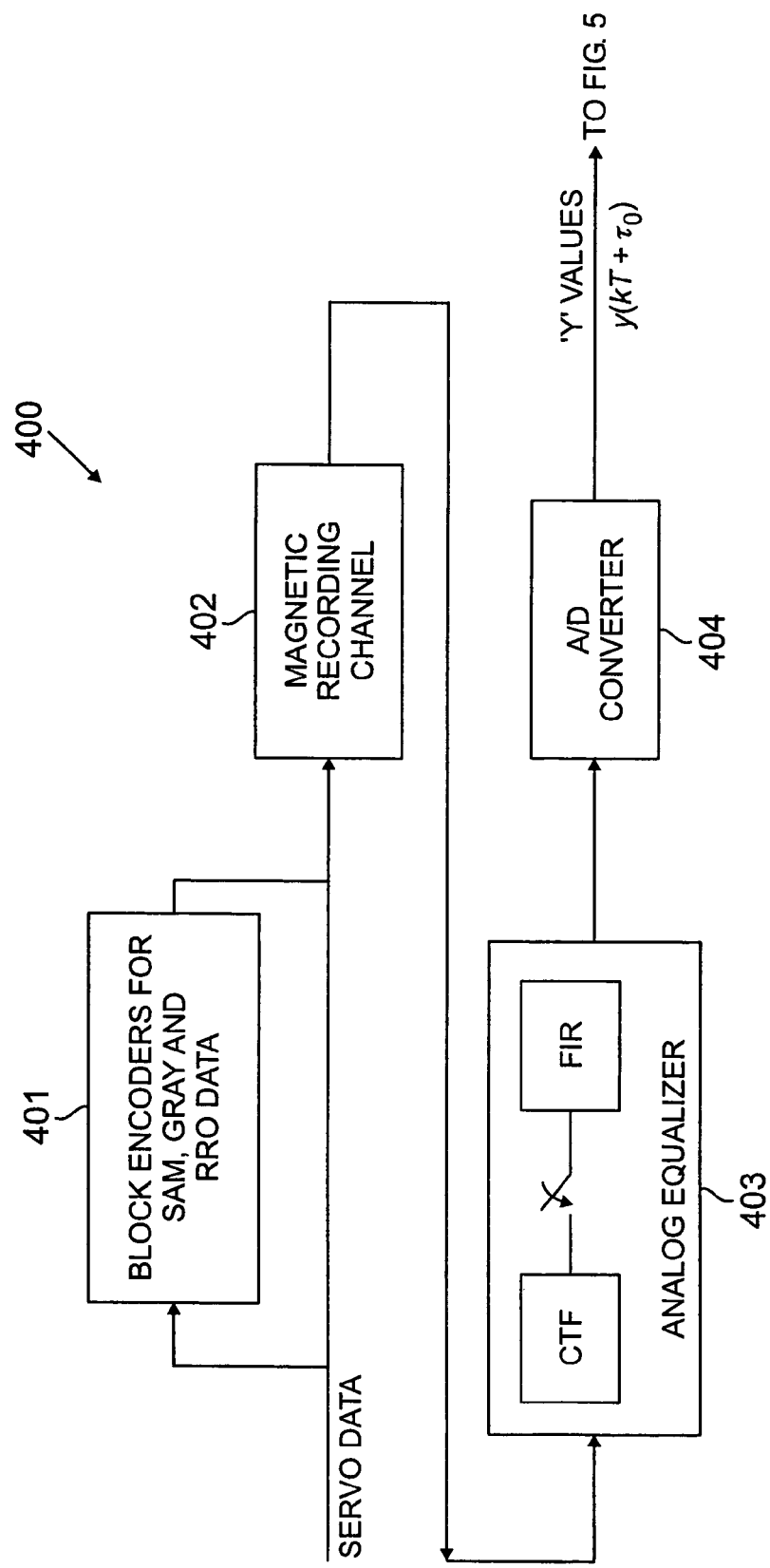
FIG. 4 is a schematic block diagram of an analog front end of an exemplary conventional magnetic recording system.

FIG. 4 is a schematic block diagram of an analog front end of an exemplary conventional magnetic recording system 400. As shown in FIG. 4, servo data is encoded by an encoder 401 that receives M input bits and generates N output bits. Different encoders can be employed for different fields 201–205 of the servo data 200. The encoded servo information is written to the disk and read back by a magnetic recording head 402. The readback data is equalized to a desired target partial response by an equalizer 403 comprising of a continuous time filter (CTF) in tandem with a discrete time finite impulse response (FIR) filter. For servo fields such as the SAM 202, Gray data 203, and demodulation fields 204, a digital phase locked loop (DPLL) could be used to aid the sampling of the FIR filter. However, for the RRO field 205, the FIR filter is sampled asynchronously because, as mentioned above, the signal sampling phase is unknown and no preamble can be used (for format efficiency reasons) to determine this sampling or timing phase with the aid of a DPLL. In FIG. 4, the FIR is asynchronously sampled.

The output of the equalizer 403 is digitized using an A/D converter 404, that generates 'Y' values. The 'Y' values are then fed into the RRO field detector, shown in FIG. 5.

Figure 5:
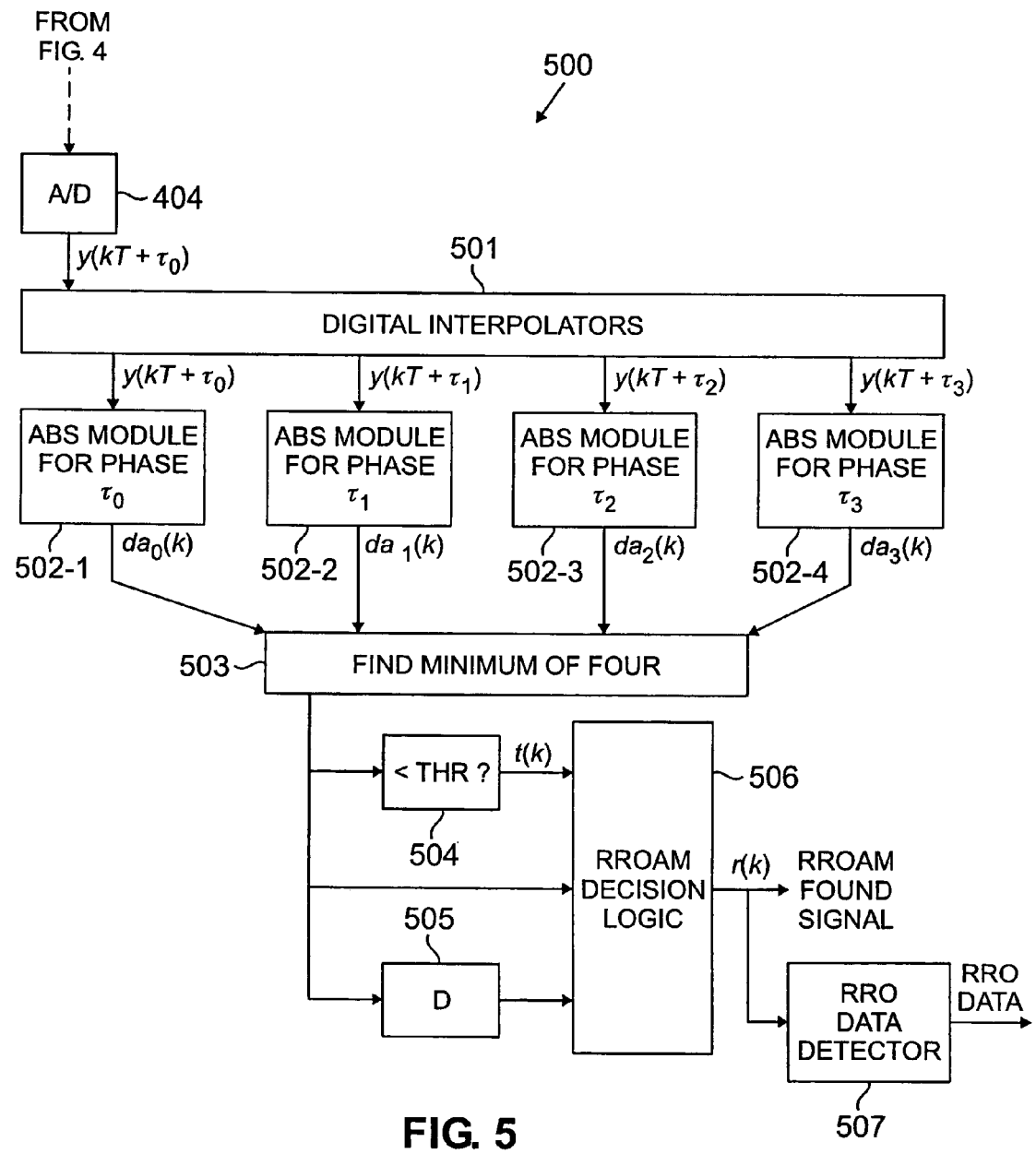
FIG. 5 is a schematic block diagram of an exemplary conventional asynchronous maximum likelihood RRO (AMLRRO) detector.

FIG. 5 is a schematic block diagram of an exemplary conventional asynchronous maximum likelihood RRO (AMLRRO) detector 500. As shown in FIG. 5, the digitized Y values generated by the A/D converter 404 are then digitally interpolated by one or more interpolators 501. The digital interpolators 501 interpolate the asynchronous samples from the receiver's A/D converter 404 to generate one or more interpolated samples in between the asynchronous samples. Thus, each digital interpolator generates an interpolated sample corresponding to some phase relative to that of the sample timing of the A/D converter 404. For a more detailed discussion of suitable digital interpolators 501, see, for example, U.S. patent application Ser. No. 10/676,560, filed Sep. 30, 2003, entitled "Detection of Recorded Data Employing Interpolation With Gain Compensation," incorporated by reference herein.

Maximum likelihood detection occurs when the series of peaks in the RRO address mark field are detected based on the detection of the entire sequence of peaks together. Asynchronous maximum likelihood (AML) RRO detection is performed by choosing the ADC or the interpolated sample sequence that is closest in Euclidean distance (or an approximation to Euclidean distance such as the absolute value of the distance metric) to the RRO address mark sample sequence. Let $y(kT+\tau_0)$ be the ADC samples (where $\tau_0=0$) and let $y(kT+\tau_m)$ be the samples based on the mth interpolated phase. Also, let $\hat{y}$ be the ideal peak sample values for the address mark. Let the number of positive and negative peaks in the address mark used by the RRO detector be B. Let the absolute value distance metric for the mth phase at time k be:

$$da_m(k) = \sum_{b=0}^{B-1} |y(kT + \tau_m - 4Tb) - \hat{y}(kT - 4Tb)|,$$

where it is assumed that the RRO data is constrained such that peaks are 4T apart. The above expression is computed by four ABS modules 502-1 through 502-4, discussed below in conjunction with FIG. 6, for four different phases.

Figure 6:
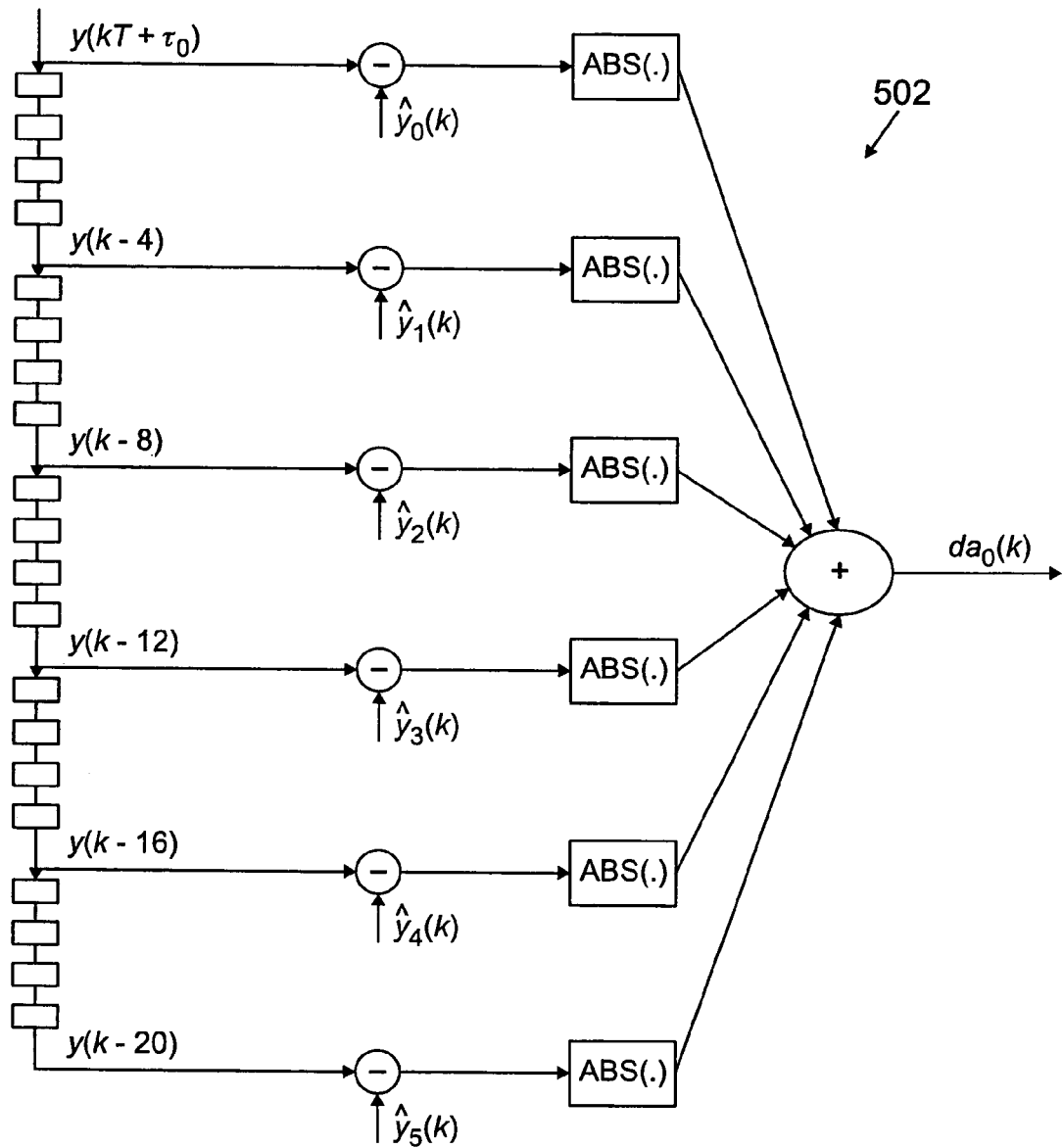
FIG. 6 is a schematic block diagram of an exemplary ABS module of FIG. 5.

FIG. 6 is a schematic block diagram of an exemplary ABS module 502. The exemplary ABS module 502 computes one of the four phases (m=0), assuming that the RRO detector uses six peaks in the RRO address mark field 302 for detecting it. Note that FIG. 6 does not show the implementation latencies. The algorithm could also be modified appropriately if some peaks were more or less than 4T apart, as would be apparent to a person of ordinary skill in the art.

The RRO address mark 302 is obtained by minimizing at stage 503 the above absolute distance metric and desiring that the minimum value of the squared distance be below a certain detection threshold, thr, i.e., $$\min(m,k)(da_m(k), \text{ such that}(da_m(k)<thr)).$$

In order to accomplish this minimization, we first declare a tentative RROAM found when the above expression falls below the threshold thr. However, falling below the threshold may not guarantee the best sample phase for detecting the RRO data values. Therefore we may want to wait one more clock cycle and choose an alternate sample phase for obtaining the optimal RRO BER. Therefore, the RRO AM found signal is declared at stage 506 based on the following decision rule:

$$r(k) = \begin{cases} t(k) & \text{if } (da_m(k) \leq da_m(k-1)) \\ t(k-1) & \text{if } (da_m(k) > da_m(k-1)) \end{cases}.$$

The RRO data detector uses the RRO AM found signal, r(k), and the corresponding best phase (m) to detect the RRO data bits 303. The detection performed by the RRO data detector depends on the RRO data encoder employed to encode the RRO data.

Figure 7:
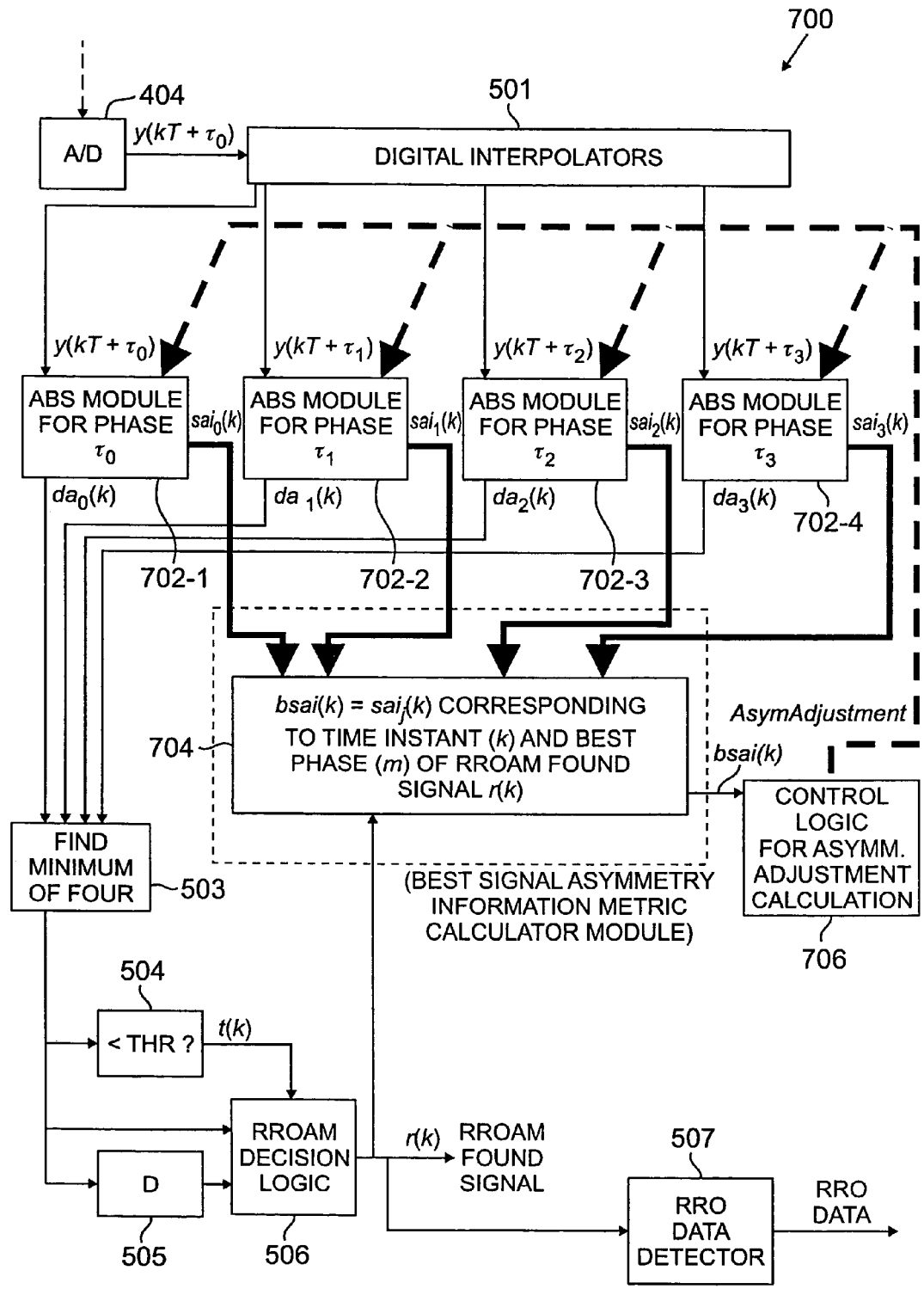
FIG. 7 is a schematic block diagram of an AMLRRO detector incorporating features of the present invention.

FIG. 7 is a schematic block diagram of an asynchronous maximum likelihood RRO (AMLRRO) detector 700 incorporating features of the present invention. As discussed hereinafter, the AMLRRO detector 700 of FIG. 7 extends the conventional AMLRRO detector 500 of FIG. 5 to include a novel signal asymmetry control scheme.

The AMLRRO detector 700 employs maximum likelihood detection in a similar manner to the conventional AMLRRO detector 500 by choosing the ADC or the interpolated sample sequence that is closest in Euclidean distance (or an approximation to Euclidean distance such as the absolute value of the distance metric) to the RRO address mark sample sequence. Again, let $y(kT+\tau_0)$ denote the ADC samples (where $\tau_0=0$) and let $y(kT+\tau_m)$ be the samples based on the mth interpolated phase. Also let $y(kT+\tau_0)$ be the ideal peak sample values for the RRO address mark 302. Let the number of positive and negative peaks in the address mark used by the RRO detector be B. Then, the absolute value distance metric for the mth phase at time k is given by $$da_m(k) = \sum_{b=0}^{B-1} |y(kT + \tau_m - 4Tb) - \hat{y}(kT - 4Tb)|,$$

where it is assumed that the RRO data 205 is constrained such that peaks are 4T apart. The above expression is computed by four ABS modules 702-1 through 702-4 for four different phases, as shown in FIG. 7 and discussed further below in conjunction with FIG. 8.

According to one aspect of the invention, the ABS modules 602 supply signal asymmetry information, in addition to the absolute value of the distance metric. Let the signal asymmetry information for the mth phase at time k, $sai_m(k)$, be expressed as $$sai_m(k) = \sum_{b=0}^{B-1} y(kT + \tau_m - 4Tb).$$

Figure 8:
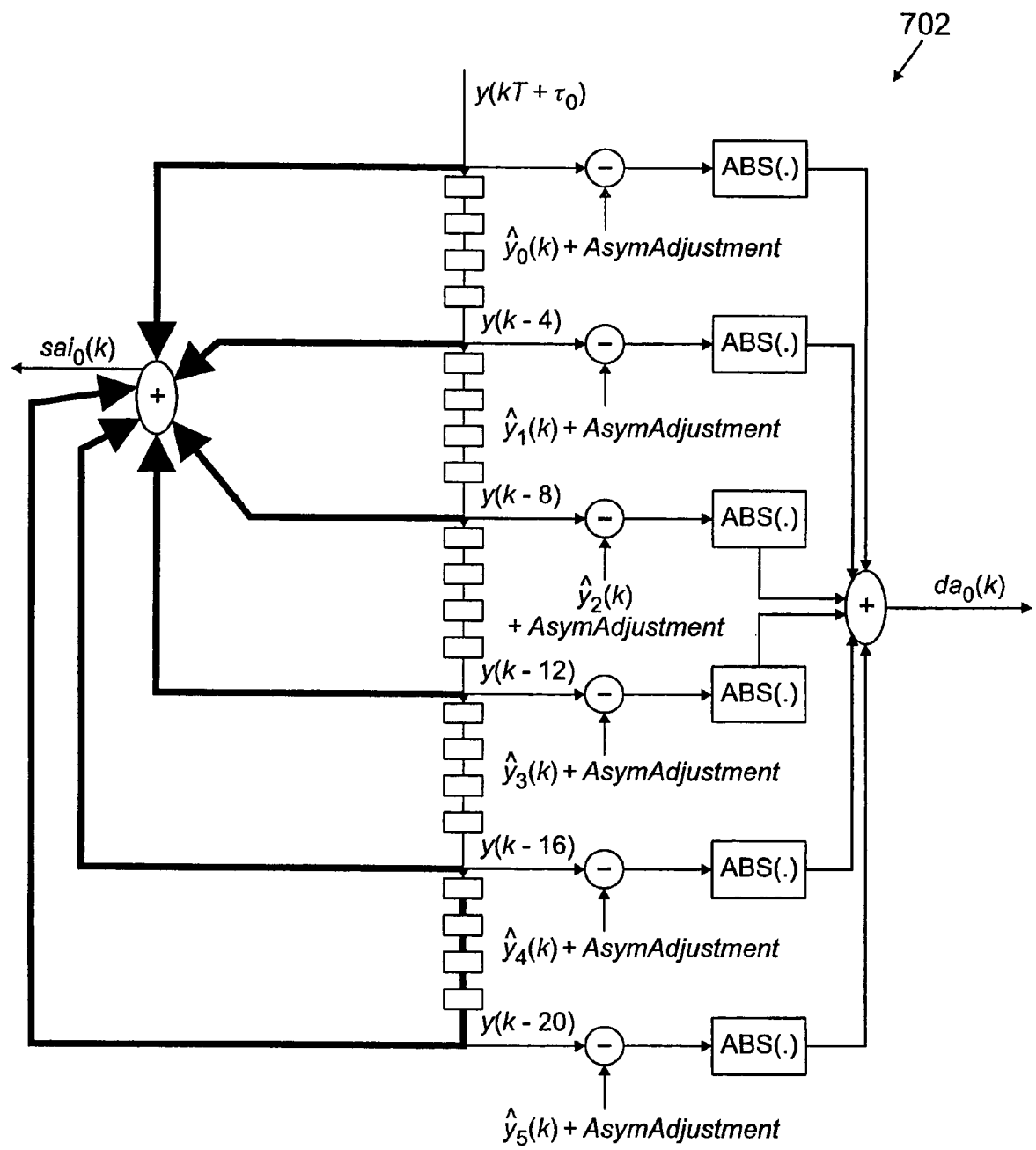
FIG. 8 is a schematic block diagram of an exemplary ABS module of FIG. 7 incorporating features of the present invention.

FIG. 8 is a schematic block diagram of an exemplary ABS module 702 incorporating features of the present invention. The exemplary ABS module 602 computes the $da_0(k)$ and the $sai_0(k)$ for one of the four phases (m=0), assuming that the RRO detector uses six peaks in the RRO address mark field 302 for detecting the address mark. The algorithm could be modified appropriately if some peaks were more or less than 4T apart, as would be apparent to a person of ordinary skill in the art.

Again, the address mark is found by minimizing at stage 503 the above absolute distance metric and desiring that the minimum value of the squared distance be below a certain detection threshold, thr., i.e., $$\min(m,k)(da_m(k), \text{ such that}(da_m(k)<thr)).$$

In order to accomplish this minimization, a tentative RROAM is declared to be found when the above expression falls below the threshold, thr. However, falling below the threshold may not guarantee the best sample phase for detecting the RRO data values. Therefore, it may be desirable to wait one more clock cycle and choose an alternate sample phase for obtaining the optimal RRO BER. Therefore, the RRO AM found signal is declared based on the following decision rule:

$$r(k) = \begin{cases} t(k) & \text{if } (da_m(k) \le da_m(k-1)) \\ t(k-1) & \text{if } (da_m(k) > da_m(k-1)) \end{cases}$$

The AMLRRO detector 700 makes use of the RROAM found signal, r(k), together with the signal asymmetry information, $sai_m(k)$, to compensate for the signal asymmetry in the RRO field as follows. The signal asymmetry information corresponding to the time instant (k) and the best phase (m) of RROAM found signal, r(k), is referred to herein as the best signal asymmetry information metric and is denoted by bsai(k). A best signal asymmetry information metric calculator module 704 implements the calculation of the best signal asymmetry information metric bsai(k).

Figure 9:
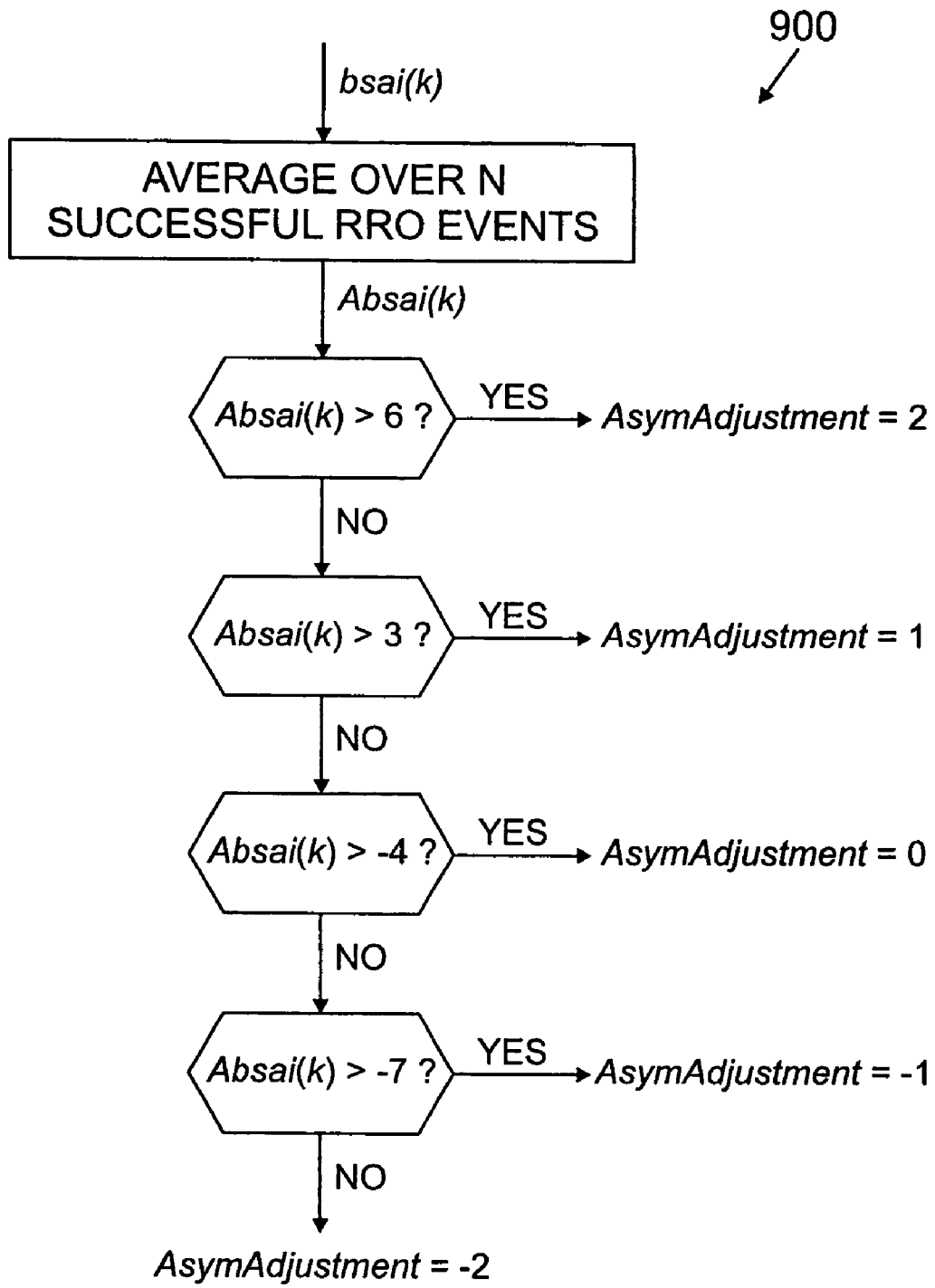
FIG. 9 is a flow chart describing an exemplary implementation for an asymmetry adjustment computation algorithm.

As discussed below in conjunction with FIG. 9, the best signal asymmetry information metric, bsai(k), is averaged over N successful RRO events, where N is a programmable value. A successful event is defined as an RRO event where the RRO AM found signal, r(k), is found. The averaged best signal asymmetry information metric is denoted by Absai(k). The averaged best signal asymmetry information metric, Absai(k), is used by the control logic 706 to adjust the ideal peak values (used for RRO address mark detection) by a certain amount, AsymAdjustment, discussed below in conjunction with FIG. 9, that depends on the severity of the signal asymmetry.

FIG. 8 illustrates the the ideal peak sample values $y(kT+\tau_0)$ are adjusted by the value AsymAdjustment for one of the four phases (m=0), assuming that the RRO detector uses six peaks in the RRO address mark field 302 for detecting the RRO address mark.

For the purpose of illustrating an exemplary asymmetry adjustment computation algorithm 900, assume that the following data sequence is used for the RRO address mark: 001100111100110000111100.

The read back digitized samples after the A/D 404, equalized to an Extended Partial Response 4 (EPR4) [5 5 −5 −5] target, will have the following six peaks in the RRO address mark [20 20−20−20 20−20], separated by 4T. It is first noted that the nominal value of the averaged best signal asymmetry information metric, Absai(k), is 20+20−20−20+20−20=0. It is also noted that the value of Asym-Adjustment depends on the severity of the signal asymmetry that could be present in a readback waveform corresponding to the RRO field 205. For example, it could be assumed that the severity of the signal asymmetry can be up to 2 least significant bits (LSBs) in the ADC 404 and the interpolated samples.

Based on these two observations, an exemplary look-up table can be generated to specify the value of AsymAdjustment to adjust the ideal peak values, given the averaged best signal asymmetry information metric Absai(k). As illustrated in FIG. 9, an exemplary implementation for the AsymAdjustment look-up table 900 (or an alternate asymmetry adjustment computation algorithm 900) could be:

a) AsymAdjustment=2 if Absai(k)>6;
b) AsymAdjustment=1 if 3<Absai(k)≤6;
c) AsymAdjustment=0 if −4<Absai(k)≤3;
d) AsymAdjustment=−1 if −7<Absai(k)≤−4;
e) AsymAdjustment=−2 if Absai(k)≤−7.

As shown in FIG. 7, the AsymAdjustment from the control logic block 706 goes to the absolute value distance metric calculating modules 702. The absolute value distance metric used for detecting the RRO address mark 302 for the mth phase at time k is then modified as follows:

$$da_m(k) = \sum_{b=0}^{B-1} |y(kT + \tau_m - 4Tb) - \hat{y}(kT - 4Tb) + AsymAdjustment|.$$

FIG. 8 illustrates the implementation of the above equation in an exemplary ABS module 702 for one of the four phases (m=0).

The above procedure may be repeated for every N successful RRO events, for continuous adaptation of the A/D samples.

Figure 10:
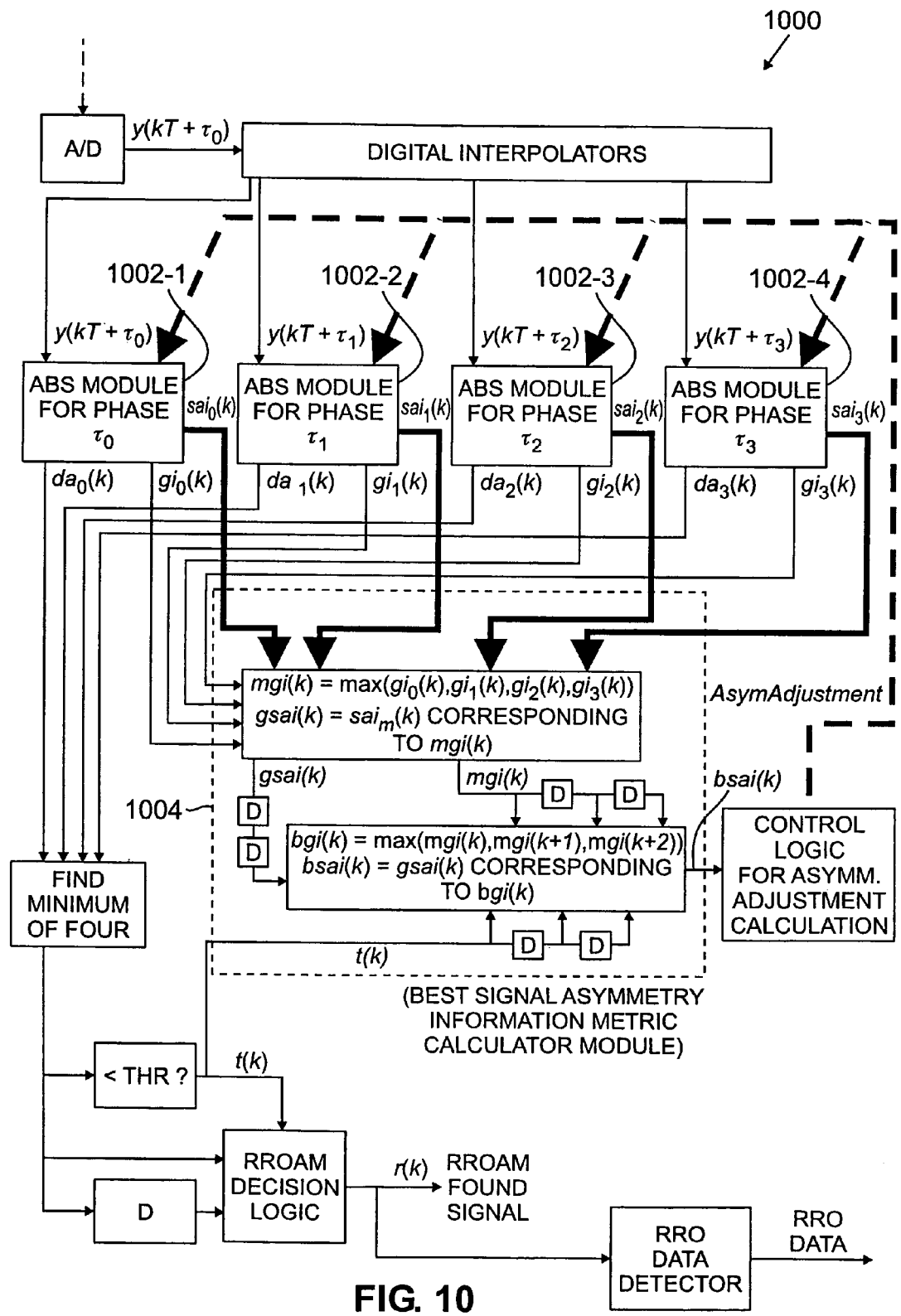
FIG. 10 is a schematic block diagram of an AMLRRO detector incorporating features of the present invention to compensate for signal asymmetry and gain error.

In a further variation shown in FIG. 10, gain error information may also be employed for the best signal asymmetry information metric calculation. For a detailed discussion of a magnetic recording system that employs ML detection of RRO data with gain compensation, see, U.S. patent application Ser. No. 10/676,560, filed Sep. 30, 2003, entitled "Detection of Recorded Data Employing Interpolation With Gain Compensation," incorporated by reference herein.

Generally, the gain error information for the mth phase at time k, is expressed as $$gi_m(k) = \sum_{b=0}^{B-1} |y(kT + \tau_m - 4Tb)|.$$

Figure 11:
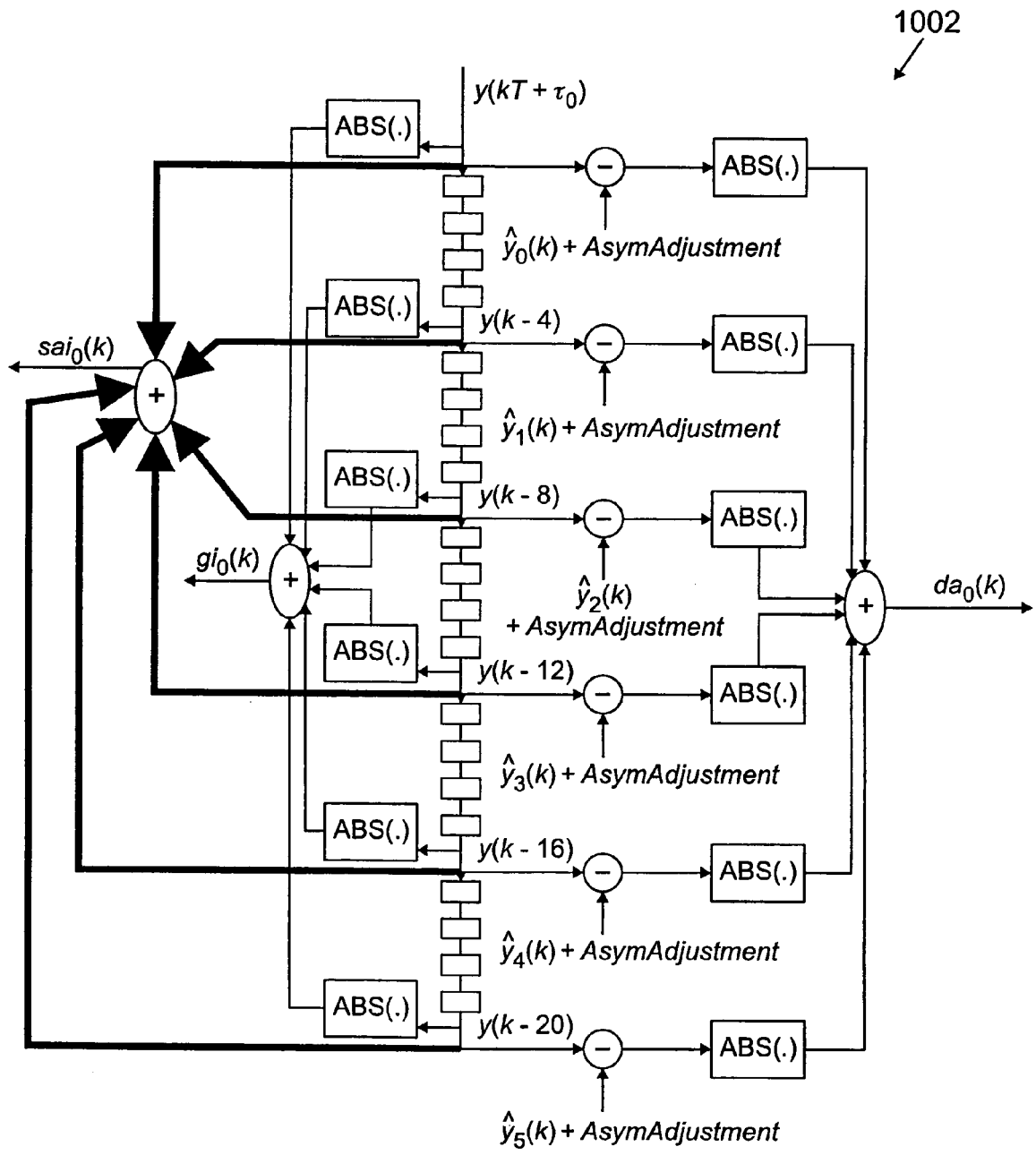
FIG. 11 is a schematic block diagram of an exemplary ABS module of FIG. 10 incorporating features of the present invention.

The above gain error information $gi_m$ can be simultaneously generated while generating the absolute value distance metrics and the signal asymmetry information metrics. FIG. 11 is a schematic block diagram of an exemplary ABS module 1002 incorporating features of the present invention. The exemplary ABS module 1002 computes the $da_0(k)$, $gi_0(k)$ and the $sai_0(k)$ for one of the four phases (m=0), assuming that the RRO detector uses six peaks in the RRO address mark field 302 for detecting the RRO address mark 302.

Recall that the tentative RROAM found t(k)=1 is declared when min (m,k)(da$_m$(k), such that(da$_m$(k)<thr)) is satisfied. The variation to the invention makes use of this tentative RROAM found signal, t(k), together with the gain error information gi$_m$(k) and the signal asymmetry information, sai$_m$(k), to compensate for the signal asymmetry in the RRO field as follows.

Every T, the maximum of four (m=0, 1, 2, 3) of the gain error information metrics is obtained. Let the maximum of the gain error information be denoted by mgi(k). Let the signal asymmetry information corresponding to the maximum gain error information be denoted by gsai(k). gsai(k) represents good signal asymmetry information every T. The maximum gain error information metrics and the good signal asymmetry information metrics corresponding to the time the tentative address mark is found, i.e. when t(k)=1, and for the next two consecutive time periods are noted and fed to the best signal asymmetry information metric logic calculator. The calculator then finds the maximum of the three maximum gain error information metrics corresponding to the three time periods, i.e., the time when t(k)=1 and for the next two consecutive time periods. The maximum of the three gain error information metric maxima is denoted by bgi(k) and is referred to as the best gain information error metric. The best signal asymmetry metric, bsai(k), is then taken as the good signal asymmetry metric, gsai(k), corresponding to the best gain error information metric, bgi(k). A best signal asymmetry information metric calculator module 1004 implements the calculation of the best signal asymmetry information metric bsai(k).

The new best signal asymmetry information metric bsai (k) is used to compensate for signal asymmetry in the RRO field as described above.

The present invention provides substantially improved detection performance for asynchronously sampled servo RRO information in the presence of signal asymmetry, which is needed for next generation read channels. The invention can improve detection of asynchronous data in the presence of signal asymmetry in the RRO data field with respect to the other servo information fields. The detection scheme presented in this invention is also asynchronous and thus handles well the RRO information written asynchronously to the hard disk. If technology permits to write RRO information synchronously to the hark disk, then the same algorithm will work well for the synchronous sampled servo system as well. The invention can be applied for any encoded (encoder independent schemes) system with appropriate modifications as dictated by the encoder code constraints.

It is to be understood that the embodiments and variations shown and described herein are merely illustrative of the principles of this invention and that various modifications may be implemented by those skilled in the art without departing from the scope and spirit of the invention.

We claim:

1. A method for detecting data, comprising the steps of:
   generating one or more interpolated sample sequences from said data, wherein each interpolated sample sequence has a different corresponding phase relative to said data;
   generating a distance measure between a portion of each interpolated sample sequence and an ideal sample sequence, wherein said ideal sample sequence corresponds to peaks in said data;
   generating signal asymmetry information for said portion of each sample sequence;
   selecting a sample sequence based on said distance measures for use in detecting said data; and
   adjusting said ideal sample sequence based on said signal asymmetry information.

2. The method of claim 1, wherein said data is a sample sequence read from a recording channel.

3. The method of claim 1, wherein said peak levels are used to search for an RRO address mark.

4. The method of claim 1, wherein said signal asymmetry information is a sum of values corresponding to one or more positive and negative peaks.

5. The method of claim 4, wherein said signal asymmetry information is averaged over a number of successful attempts to read said data.

6. The method of claim 4, wherein said step of adjusting said ideal sample sequence based on said signal asymmetry information comprises the step of adjusting said ideal sample sequence based on said sum.

7. The method of claim 4, wherein said sum provides an indication of a strength of said signal asymmetry.

8. The method of claim 1, further comprising the step of adjusting said ideal sample sequence based on a gain error metric.

9. The method of claim 1, wherein said data is asynchronous data.

10. The method of claim 1, wherein said data is synchronous data.

11. An apparatus for detecting data, comprising:
    an interpolator adapted to generate one or more interpolated sample sequences from said data, wherein each interpolated sample sequence has a different corresponding phase relative to said data; and
    a detector adapted to:
    generate a distance measure between a portion of each interpolated sample sequence and an ideal sample sequence, wherein said ideal sample sequence corresponds to peaks in said data;
    generate signal asymmetry information for said portion of each sample sequence; select a sample sequence based on said distance measures for use in detecting said data; and
    adjust said ideal sample sequence based on said signal asymmetry information.

12. The apparatus of claim 11, wherein said data is a sample sequence read from a recording channel.

13. The apparatus of claim 11, wherein peak levels are used to search for an RRO address mark.

14. The apparatus of claim 11, wherein said signal asymmetry information is a sum of values corresponding to one or more positive and negative peaks.

15. The apparatus of claim 14, wherein said signal asymmetry information is average over a number of successful attempts to read said data.

16. The apparatus of claim 14, wherein said step of adjusting said ideal sample sequence based on said signal asymmetry information comprises the step of adjusting said ideal sample sequence based on said sum.

17. The apparatus of claim 14, wherein said sum provides an indication of a degree of said signal asymmetry.

18. The apparatus of claim 11, wherein said detector is further adapted to adjust said ideal sample sequence based on a gain error metric.

19. A method for detecting data, comprising the steps of:
    detecting said data based on interpolation techniques that compute a distance mesure between a portion of interpolated sample sequences and an ideal sample sequence, wherein said ideal sample sequence corresponds to peaks in said data; and adjusting at least one sample sequence based on signal asymmetry information.

20. The method of claim 19, wherein said signal asymmetry information is a sum of values corresponding to one or more positive and negative peaks.

* * * * *

UNITED STATES PATENT AND TRADEMARK OFFICE
CERTIFICATE OF CORRECTION

PATENT NO. : 7,180,693 B2  
APPLICATION NO. : 10/824326  
DATED : February 20, 2007  
INVENTOR(S) : Viswanath Annampedu et al.

Page 1 of 1

It is certified that error appears in the above-identified patent and that said Letters Patent is hereby corrected as shown below:

In claim 15, column 10, line 54, "average" should be replaced by -- averaged --.

Signed and Sealed this
Twenty-fifth Day of December, 2012

David J. Kappos
*Director of the United States Patent and Trademark Office*